(12) United States Patent
Clark et al.

(10) Patent No.: US 9,596,578 B1
(45) Date of Patent: Mar. 14, 2017

(54) VOICEMAIL GREETING FINGERPRINT MATCHING TO DIFFERENTIATE BETWEEN HUMAN AND VOICEMAIL GREETINGS

(71) Applicant: Citrix Systems, Inc., Fort Lauderdale, FL (US)

(72) Inventors: Brett Clark, Irasburg, VT (US); Christopher Rienzo, Waltham, MA (US)

(73) Assignee: GetGo, Inc., Fort Lauderdale, FL (US)

(*) Notice: Subject to any disclaimer, the term of this patent is extended or adjusted under 35 U.S.C. 154(b) by 0 days.

(21) Appl. No.: 15/178,106

(22) Filed: Jun. 9, 2016

(51) Int. Cl.
| | |
|---|---|
| *H04M 11/10* | (2006.01) |
| *H04W 4/12* | (2009.01) |
| *H04M 3/533* | (2006.01) |
| *H04W 4/16* | (2009.01) |
| *H04M 3/46* | (2006.01) |
| *G10L 25/78* | (2013.01) |

(52) U.S. Cl.
CPC ............. *H04W 4/12* (2013.01); *G10L 25/78* (2013.01); *H04M 3/46* (2013.01); *H04M 3/53383* (2013.01); *H04W 4/16* (2013.01)

(58) Field of Classification Search
CPC ..... H04W 4/12; H04W 4/16; H04M 3/53383; H04M 3/46; G10L 25/78
See application file for complete search history.

(56) References Cited

U.S. PATENT DOCUMENTS

| | | | |
|---|---|---|---|
| 5,404,400 A | 4/1995 | Hamilton | |
| 8,606,245 B1 | 12/2013 | Eccelston et al. | |
| 9,210,264 B2 | 12/2015 | Siminoff | |
| 2006/0256945 A1 | 11/2006 | Noble, Jr. | |
| 2007/0165554 A1* | 7/2007 | Jefferson | H04M 3/42263 370/315 |
| 2013/0094637 A1* | 4/2013 | Shaw | H04M 3/42059 379/88.18 |

* cited by examiner

*Primary Examiner* — Ajit Patel
(74) *Attorney, Agent, or Firm* — BainwoodHuang

(57) ABSTRACT

Techniques are disclosed for using voicemail fingerprints to detect when a call has been answered by voicemail. A voicemail fingerprint of a known voicemail greeting is stored in association with a telephone number. The voicemail fingerprint contains a set of audio analysis streams, each of which contains audio characteristics of the known voicemail greeting beginning at a different offset from the beginning of the known voicemail greeting. A current audio analysis stream is generated containing audio characteristics of audio received beginning when a call to the telephone number is answered. If the current audio analysis stream matches one of the audio analysis streams contained in the voicemail fingerprint of the known voicemail greeting associated with the telephone number, the call to the telephone number has been answered by a voicemail box of the telephone number, and may be transferred to a secondary destination.

17 Claims, 8 Drawing Sheets

VOICEMAIL GREETING FINGERPRINT MATCHING TO DIFFERENTIATE BETWEEN HUMAN AND VOICEMAIL GREETINGS

BACKGROUND

As it is generally known, voicemail is an electronic system that may be used to store a message left by a caller for later retrieval by an intended call recipient. A call may be transferred to a voicemail box of a called telephone number when the call is not answered by a human after a predetermined number of rings, and/or in response to various configuration settings and/or user actions. Voicemail messages may be stored as digitized audio, and may be retrieved from the voicemail box as audio, or translated into text for visual display. Most mobile network operators offer voicemail as a basic feature, and many corporate Private Branch Exchanges (PBXs) include internal voice-messaging services. Voicemail subscriptions are also available to land line subscribers.

When a telephone call is transferred to a voicemail box, the voicemail system locates and plays out a voicemail greeting for the voicemail box. The voicemail greeting may include customized audio content entered by the voicemail box owner, e.g. a name of the person, department or organization associated with the telephone number, or other customized content. The voicemail greeting may also include one or more default prompts that are automatically generated, e.g. that instruct the caller as to various options with regard to leaving a message, contacting an operator, etc.

In certain circumstances, it may be desirable to detect when a call has been answered by a voicemail system. For example, when an automated calling system places a call, it may be desirable for the system to perform one action in the event that the call is answered by a human, and another, different action, if the call is instead answered by a voicemail system.

SUMMARY

Unfortunately, previous approaches to automatically detecting when a telephone call has been answered by voicemail have exhibited significant shortcomings. Some previous automatic calling systems have started a timer when a call is answered, and determined that the call was answered by a voicemail box if a requested keypad selection was not received prior to expiration of a time out period. While sufficiently effective for some applications, these previous timer based approaches have sometimes resulted in significant delays prior to detecting that a call was answered by a voicemail box. Lengthy delays are unacceptable when the call is a forwarded call, and a human that placed the original call is required to wait on the line for the entire duration of the time-out period. In addition, if a prompt requesting a specific keypad selection is repeated, as is commonly done, the prompt may be recorded as part of an erroneous voicemail message captured and stored in the voicemail box for the called number, causing annoyance and inconvenience for the voicemail box owner.

Other previous systems have checked the audio received when a call is answered for patterns that are typical of all voicemail greetings, including timings of silence and speech within the received audio, and/or the presence of a generated tone indicating that a voicemail message may be left. These generalized detection systems may sometimes provide voicemail box detection with up to approximately 90 percent accuracy. However, in certain applications, a misidentification rate approaching 10 percent is unacceptable, e.g. when correct handling of each individual call is important with regard to providing an acceptable level of customer satisfaction.

To address the above and other shortcomings of previous systems, new techniques are disclosed herein that use voicemail fingerprints to detect when a call has been answered by voicemail. In one embodiment, the disclosed system stores a forwarding telephone number and a secondary forwarding destination for each one of multiple top level telephone numbers. For each one of the forwarding telephone numbers, the disclosed system also stores a voicemail fingerprint of a known voicemail greeting that is associated with the forwarding telephone number. The stored voicemail fingerprint is made up of a set of audio analysis streams. Each one of the audio analysis streams in the voicemail fingerprint contains audio characteristics of the known voicemail greeting beginning from a different temporal offset relative to the beginning of the known voicemail greeting.

When a call directed to a top level telephone number is received, an outgoing call is automatically initiated to the forwarding telephone number corresponding to the top level telephone number. The disclosed system then performs a voicemail detection operation by a) generating a current audio analysis stream containing audio characteristics of audio received when the call to the forwarding telephone number is answered, b) comparing the current audio analysis stream to each one of the audio analysis streams in the voicemail fingerprint of the known voicemail greeting associated with the forwarding telephone number, and c) in response to the current audio analysis stream matching one of the audio analysis streams contained in the voicemail fingerprint of the known voicemail greeting associated with the forwarding telephone number, detecting that the call to the forwarding telephone number has been answered by a voicemail box of the forwarding telephone number. In response to detecting that the call to the forwarding telephone number has been answered by the voicemail box of the forwarding telephone number, the disclosed system immediately transfers the received call to the secondary destination corresponding to the top level telephone number.

For example, the disclosed system may be embodied or configured such that the top level telephone number is a main number (e.g. toll free number, etc.) of a business, the corresponding forwarding telephone number may be a personal telephone number (e.g. cell phone number) of an owner, employee or agent of the business, and the corresponding secondary destination may be a voicemail box of the business associated with the top level telephone number. Upon detecting that the call to the forwarding telephone number has been answered by the voicemail box of the personal telephone number of the owner, employee or agent of the business, the disclosed system may advantageously operate to immediately transfer the call to the voicemail box of the business associated with the top level telephone number to which the call was originally placed.

Because each of the audio analysis streams in the voicemail fingerprint contains audio characteristics beginning at a different temporal offset from the beginning of the known voicemail greeting associated with the forwarding telephone number, the disclosed system may advantageously provide highly accurate detection of when a call is answered by the voicemail box of the forwarding telephone number, even in the face of differing levels of delay encountered when receiving audio after the call to the forwarding telephone number is answered. Such delays may result from various specific factors, including but not limited to communication network congestion and/or varying performance conditions on user devices and/or server systems, etc.

In another aspect of the disclosed system, the audio characteristics contained in each one of the audio analysis streams contained in the voicemail fingerprint may be organized as a series of audio characteristic chunks. In such an embodiment, each one of the audio characteristic chunks in the audio analysis streams in the voicemail fingerprint contains at least one value representing at least one characteristic of the audio in a corresponding time period within the known voicemail greeting. The audio characteristics in the current audio analysis stream may also be organized as a series of audio characteristic chunks. In such an embodiment, each one of the audio characteristic chunks in the current audio analysis stream contains at least one value representing at least one characteristic of the audio in a corresponding time period within the audio received beginning when the call to the forwarding telephone number was answered.

For example, each one of the audio characteristic chunks in one of the audio analysis streams in a voicemail fingerprint for a known voicemail greeting may contain at least one value representing a maximum volume and a strongest frequency in the audio contained in the corresponding time period within that known voicemail greeting. Similarly, each one of the audio characteristic chunks in the current audio analysis stream may contain at least one value representing a maximum volume and a strongest frequency in the audio contained in the corresponding time period within the audio received beginning when the call to the forwarding telephone number was answered.

The voicemail fingerprint for a known voicemail greeting associated with a given forwarding telephone number may be obtained in various specific ways. In one example, the disclosed system may generate voicemail fingerprints using previously recorded standard voicemail greetings of mobile network operators. The disclosed system may then use the resulting voicemail fingerprints as voicemail fingerprints for known voicemail greetings. In one example, the disclosed system may use the complete set of voicemail fingerprints generated for voicemail greetings of mobile network operators as voicemail fingerprints for known voicemail greetings with regard to each one of the forwarding telephone numbers. This approach avoids the need to have access to information indicating which specific mobile network operators provide mobile phone service for individual mobile phones associated with individual forwarding telephone numbers. Alternatively, individual ones of the voicemail fingerprints generated for voicemail greetings of mobile network operators may be stored as voicemail fingerprints for known voicemail greetings, based on which mobile network operator provides mobile phone service for the individual mobile phone associated with the individual forwarding telephone number.

In another example, the disclosed system may obtain the known voicemail greeting associated with a given forwarding telephone number by detecting that a voicemail fingerprint is not stored for the forwarding telephone number, and then performing a candidate voicemail fingerprint generation operation for the forwarding telephone number by a) recording audio received beginning when a first call to the forwarding telephone number is answered, and b) in response to detecting that a requested user input (e.g. keypad selection or voice input) was not received prior to expiration of a time out period following the first call to the forwarding telephone number being answered, generating the candidate voicemail fingerprint using the recording of the audio received beginning when the first call to the forwarding telephone number was answered. After performing the candidate voicemail generation operation, the disclosed system may perform a voicemail fingerprint confirmation operation for the forwarding telephone number by a) recording audio received beginning when a second call to the forwarding number is answered, b) in response to detecting that a requested user input (e.g. keypad selection or voice input) was not received prior to expiration of a time out period following the second call to the forwarding telephone number being answered, generating a new voicemail fingerprint based on the recording of the audio received beginning when the second call to the forwarding telephone number was answered, c) comparing the new voicemail fingerprint to the candidate voicemail fingerprint, and d) in response to the new voicemail fingerprint matching the candidate voicemail fingerprint, storing the candidate fingerprint as the voicemail fingerprint of a known voicemail greeting associated with the forwarding telephone number.

The disclosed techniques may be embodied to provide various advantages over previous systems. For example, as also stated above, the disclosed techniques may be embodied to enable highly accurate detection of when a call is answered by a specific voicemail box, even when varying levels of delay occur with regard to receipt of audio when a call to a forwarding telephone number is answered. Because the disclosed techniques do not rely exclusively on expiration of a timer to detect when a call has been answered by a voicemail box, they allow for quickly detecting that a call to a forwarding telephone number has been answered by a voicemail box, and accordingly also allow for quick transfer of the call to a second destination. As a result, a person who placed an original call to a top level telephone number may experience only a short delay when a voicemail box answers a call automatically placed to a forwarding telephone number corresponding to the originally called top level telephone number.

In addition, by quickly determining that the call to the forwarding telephone number has been answered by a voicemail box and then immediately transferring the call, the disclosed techniques may advantageously reduce the chance that a repeated prompt requesting a keypad action may be recorded as part of an errant voicemail message captured and stored in a personal voicemail box associated with the forwarding telephone number.

Moreover, by using voicemail fingerprints for known voicemail greetings uniquely associated individual forwarding telephone numbers, the disclosed techniques may enable highly accurate detection of voicemail greetings on a per-telephone number basis, thus improving accuracy over previous systems that relied on comparing greetings to characteristics that are shared by all voicemail greetings. Higher detection accuracy may in turn reduce the number of voicemail messages stored in the personal voicemail box associated with the forwarding telephone number that consist of, at least in part, a prompt requesting a user input, and may also may reduce or eliminate the wait time experienced by the person who placed the original call in the case where the call to the forwarding telephone number is answered by voicemail.

BRIEF DESCRIPTION OF THE DRAWINGS

The foregoing and other objects, features and advantages will be apparent from the following description of particular embodiments of the present disclosure, as illustrated in the accompanying drawings in which like reference characters

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
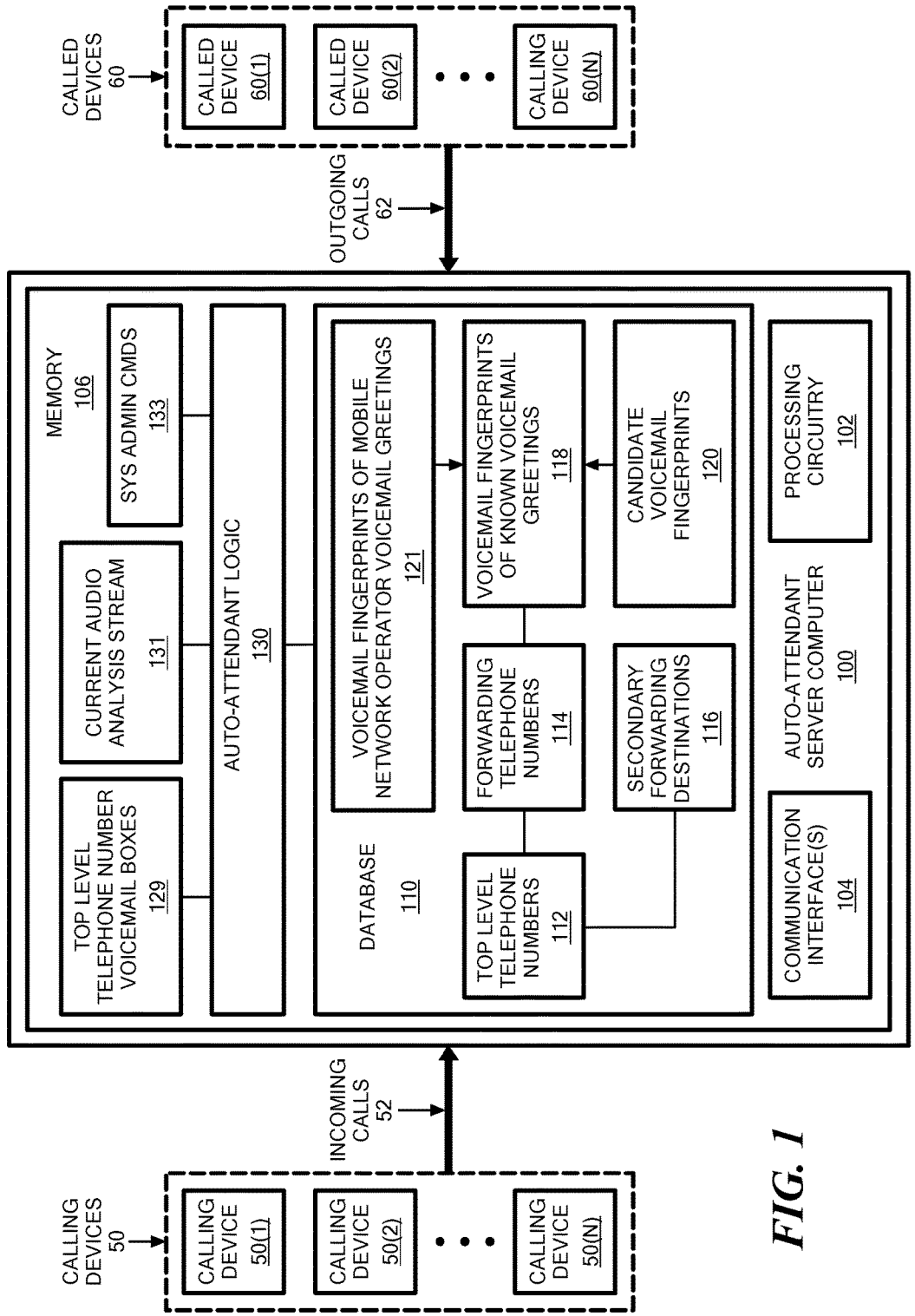
FIG. 1 is a block diagram showing an example of components in an illustrative embodiment.

FIG. 1 is a block diagram showing an example of components in an illustrative embodiment. In the example of FIG. 1, Auto-Attendant Server Computer 100 is an electronic device including Processing Circuitry 102, Communication Interface(s) 104, and Memory 106. Processing Circuitry 102 may, for example, include or consist of one or more integrated circuits that provide the functions of a central processing unit (CPU), such as one or more microprocessors or the like. Communication Interface(s) 104 may, for example, include or consist of one or more conventional network interface cards (NICs) or the like that are operable to communicably connect Auto-Attendant Server Computer 100 to one or more computer networks, such as the Internet, and/or one or more conventional telephony interfaces, and/or any other specific types of communication interfaces that enable Auto-Attendant Server Computer 100 to initiate and receive telephone calls, for example over the public switched telephone network (PSTN) and/or one or more computer networks. Communication Interface(s) 104 enable Auto-Attendant Server Computer 100 to receive telephone calls from Calling Devices 50, as illustrated by Incoming Calls 52. Incoming Calls 52 may be telephone calls directed to specific telephone numbers contained in Top Level Telephone Numbers 112. Calling Devices 50, shown for purposes of illustration as including Calling Device 50(1) through Calling Device 50(N), may be made up of or include any specific type or types of devices capable of initiating telephone calls, such as mobile phones (aka "cell phones"), Voice over IP (VOIP) devices, traditional landline telephones, etc. Communication Interface(s) 104 also enable Auto-Attendant Server Computer 100 to initiate telephone calls to Called Devices 60, illustrated in FIG. 1 by Outgoing Calls 62. Outgoing Calls 62 may be telephone calls directed to specific telephone numbers contained in Forwarding Telephone Numbers 114.

Each telephone number in Forwarding Telephone Numbers 114 is associated with one of Called Devices 60. Called Devices 60 are shown for purposes of illustration as including Called Device 60(1) through Called Device 60(N), and may also be made up of or include any specific type or types of devices capable of receiving telephone calls, such as mobile phones (aka "cell phones"), Voice over IP (VOIP) devices, traditional landline telephones, etc.

Memory 106 may include or consist of any specific type of volatile or non-volatile semiconductor memory or the like that is operable to store programs (e.g. sequences of instructions) for execution by Processing Circuitry 102, and/or data (e.g. program state information, input data, output data, etc.) for use by the programs executing in the Auto-Attendant Server Computer 100.

Auto-Attendant Server Computer 100 may consist of or include any specific type of computer or computerized device. For example, Auto-Attendant Server Computer 100 may be embodied as a server computer or system, operable to provide various specific services to customers with associated with the Top Level Telephone Numbers 112. Alternatively, or in addition, Auto-Attendant Server Computer 100 may be embodied as part of a private branch exchange (PBX), and/or as part of a voicemail server system.

The Memory 106 of Auto-Attendant Server Computer 100 stores program code for execution by the Processing Circuitry 102, shown for purposes of illustration in FIG. 1 including Auto-Attendant Logic 130. As further described below, when executed on Processing Circuitry 102, Auto-Attendant Logic 130 operates to use one or more voicemail fingerprints in Voicemail Fingerprints of Known Voicemail Greetings 118 to detect when individual ones of Outgoing Calls 62 have been answered by a voicemail box of the forwarding telephone number used to initiate the outgoing call, e.g. by a voicemail box associated with one of the forwarding telephone numbers in Forwarding Telephone Numbers 114 that was used to initiate the outgoing call.

The Database 110 is used by an embodiment of Auto-Attendant Logic 130 to provide the disclosed techniques for processing Incoming Calls 52. For purposes of illustration and explanation, Database 110 is shown containing Top Level Telephone Numbers 112, Forwarding Telephone Numbers 114, Secondary Forwarding Destinations 116, Voicemail Fingerprints of Known Voicemail Greetings 118, Candidate Voicemail Fingerprints 120, and Voicemail Fingerprints of Mobile Network Operators 121. Top Level Telephone Numbers 112 contains one or more top level telephone numbers, such as toll free telephone numbers, to which individual incoming calls in Incoming Calls 52 are directed. Forwarding Telephone Numbers 114 contains one or more forwarding telephone numbers, each one of which corresponds to one of the top level telephone numbers in Top Level Telephone Numbers 112.

Secondary Forwarding Destinations 116 contains one or more forwarding destinations, such as one or more voicemail boxes provided by Top Level Telephone Number Voicemail Boxes 129, each one of which corresponds to one of the top level telephone numbers in Top Level Telephone Numbers 112.

Voicemail Fingerprints of Known Voicemail Greetings 118 contains voicemail fingerprints of known voicemail greetings. Each voicemail fingerprint in Voicemail Fingerprints of Known Voicemail Greetings 118 corresponds to one of the forwarding telephone numbers in Forwarding Telephone Numbers 114. For example, each one of the voicemail fingerprints contained in Voicemail Fingerprints of Known Voicemail Greetings 118 may have the structure shown in FIG. 3.

Figure 5:
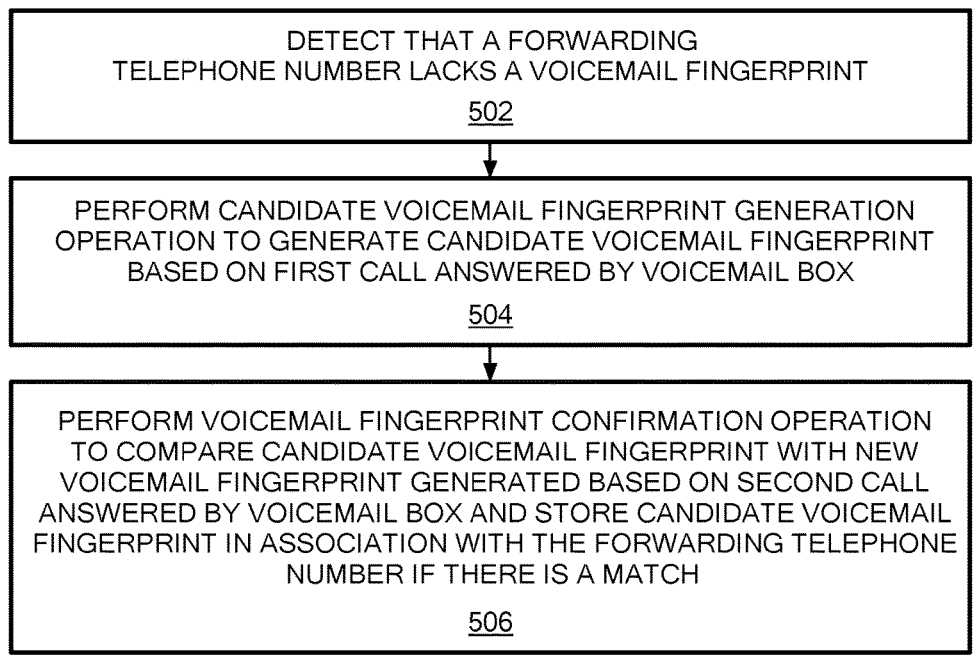
FIG. 5 is a flow chart showing another example of steps that may be performed to store voicemail fingerprints, by automatically training the disclosed system based on calls to forwarding telephone numbers that lack associated voicemail fingerprints.

Candidate Voicemail Fingerprints 120 contains one or more candidate voicemail fingerprints that are used by Auto-Attendant Logic 130 to store voicemail fingerprints in Voicemail Fingerprints of Known Voicemail Greetings 118, when automatically training the disclosed system based on calls to forwarding telephone numbers that lack voicemail fingerprints, as illustrated in FIG. 5 and further described below. Each one of the candidate voicemail fingerprints contained in Candidate Voicemail Fingerprints 120 may also have the structure shown in FIG. 3.

Figure 3:
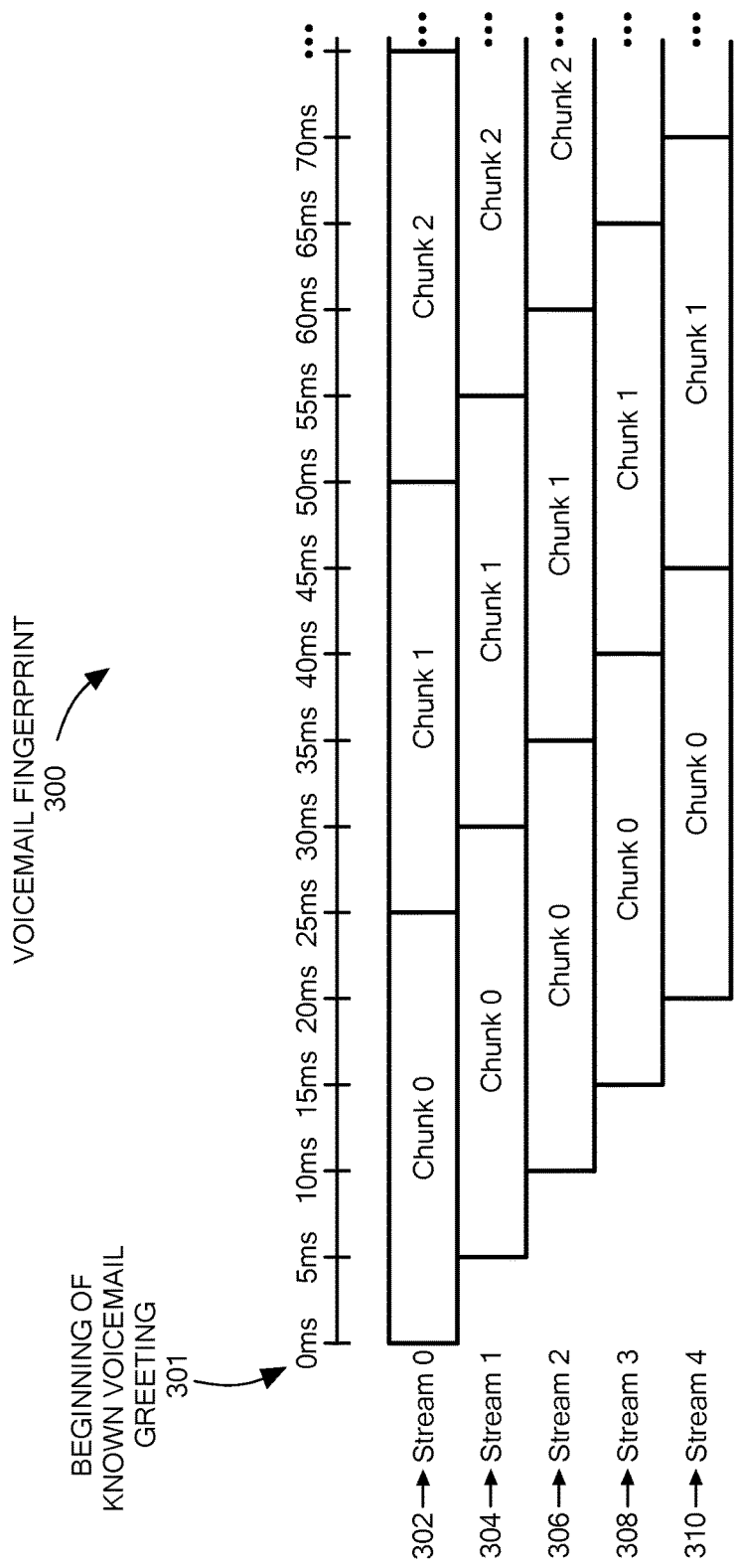
FIG. 3 shows an example of a voicemail fingerprint containing multiple audio analysis streams beginning at different temporal offsets from the beginning of a known voicemail greeting.
Figure 4:
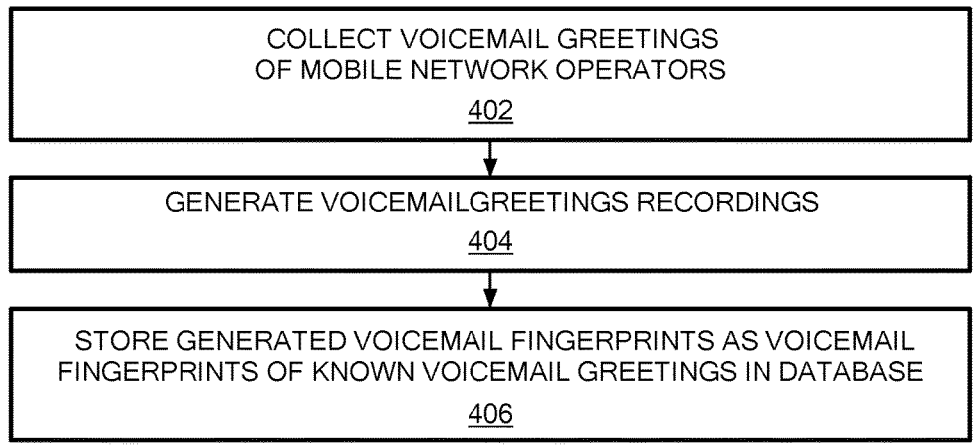
FIG. 4 is a flow chart showing an example of steps that may be performed to store voicemail fingerprints, by collecting voicemail greetings of mobile network operators and generating voicemail fingerprints using the collected voicemail greetings.

Voicemail Fingerprints of Mobile Network Operator Voicemail Greetings 121 contains voicemail fingerprints of mobile network operators that are used by Auto-Attendant Logic 130 to store voicemail fingerprints in Voicemail Fingerprints of Known Voicemail Greetings 118, when the disclosed system is embodied to collect known voicemail recordings and generate voicemail fingerprints using the collected known voicemail recordings, as illustrated in FIG. 4 and further described below. Each one of the voicemail fingerprints of mobile network operators contained in Voicemail Fingerprints of Mobile Network Operator Voicemail Fingerprints 121 may also have the structure shown in FIG. 3.

Top Level Telephone Number Voicemail Boxes 129 may consist of or include voicemail program code executable on Processing Circuitry 102 that, when executed on Processing Circuitry 102, operates to provide voicemail boxes corresponding to one or more of the top level telephone numbers in Top Level Telephone Numbers 112.

Figure 7:
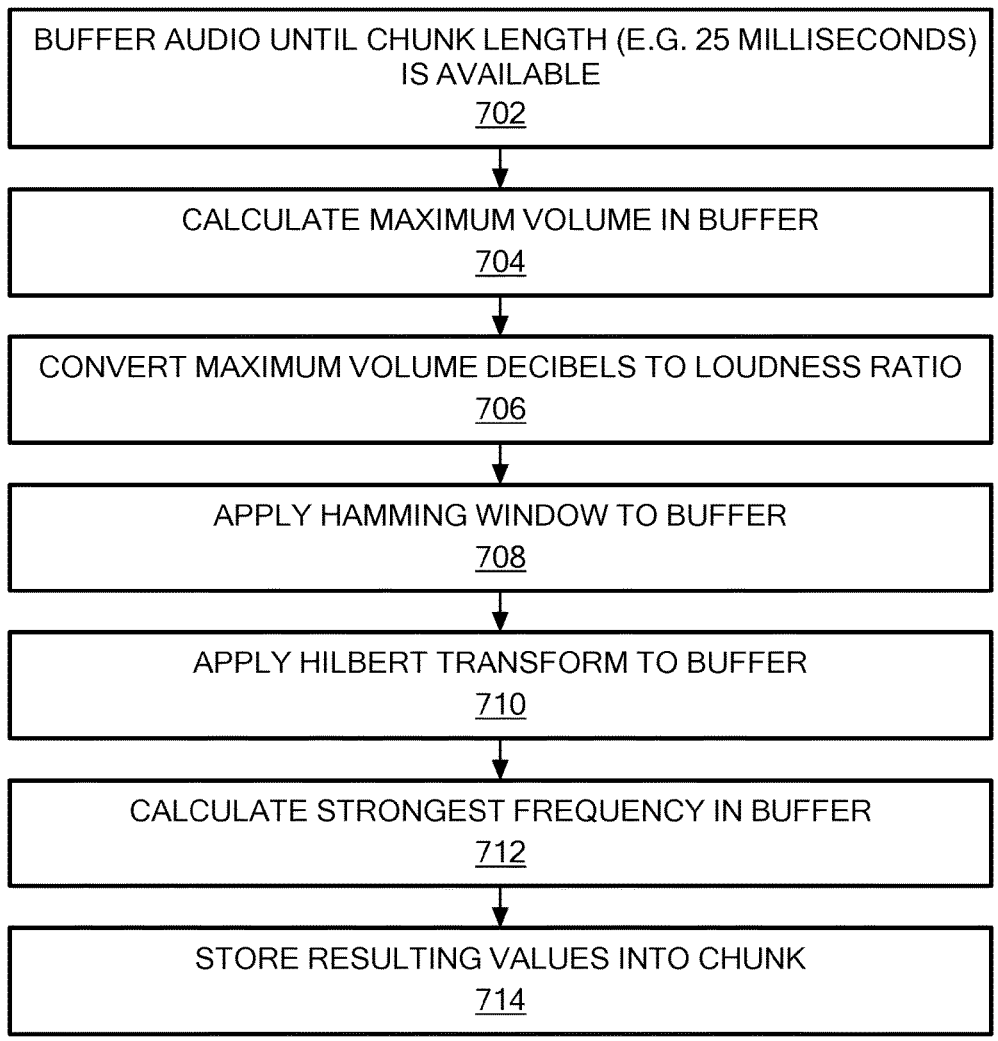
FIG. 7 is a flow chart showing an example of steps that may be performed to generate an audio analysis stream.

Current Audio Analysis Stream 131 is an audio analysis stream generated using audio received when one of Outgoing Calls 62 is answered, and that Auto-Attendant Logic 130 compares to the audio analysis streams in one of the voicemail fingerprints in Voicemail Fingerprints of Known Voicemail Greetings 118 to determine whether that one of Outgoing Calls 62 has been answered by a voicemail box associated with the one of the forwarding telephone numbers in Forwarding Telephone Numbers 114 that was used to initiate that one of Outgoing Calls 62. Current Audio Analysis Stream 131 may, for example, be generated as illustrated in FIG. 7 and further described below. For example, the audio analysis stream contained in Current Audio Analysis Stream 131 may have the same structure as one of the audio analysis streams shown in FIG. 3.

Figure 6:
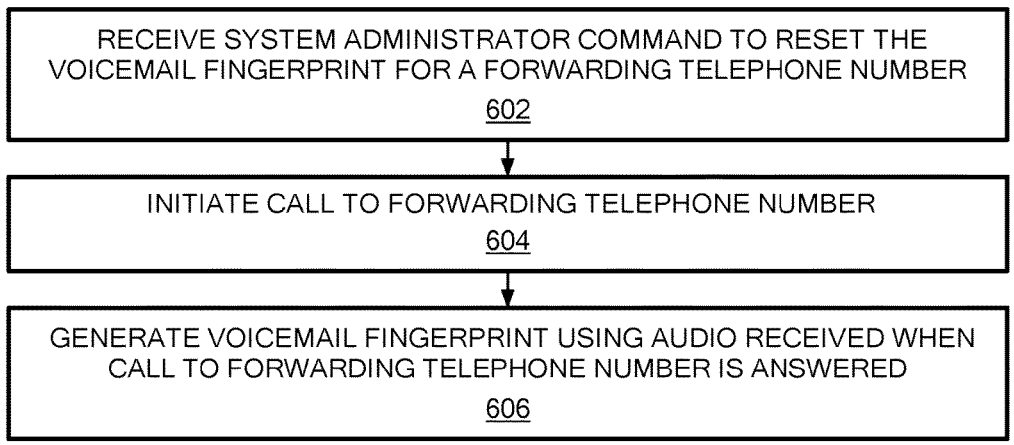
FIG. 6 is a flow chart showing another example of steps that may be performed to store voicemail fingerprints, in response to a system administrator command to reset a voicemail fingerprint for a specific forwarding telephone number.

System Administrator Commands 133 consists of at least one system administrator command, e.g. received through Communication Interface(s) 104 from a separate system administrator computer, or through a user interface generated by Auto-Attendant Logic 130 within a display device of Auto-Attendant Server Computer 100. A system administrator command in System Administrator Commands 133 may be received by Auto-Attendant Logic 130 and cause Auto-Attendant Logic 130 to store voicemail fingerprints by resetting a voicemail fingerprint for a specific forwarding telephone number, as illustrated in FIG. 6 and further described below.

Those skilled in the art will recognize that while for purposes of concise illustration and explanation only certain examples of program code and related data structures are shown in FIG. 1, other specific program code and/or data may also be present in Memory 106. Such additional software may, for example, include operating system, middleware, and/or various other specific types of application program code. Such additional data may, for example, include a database or the like operable to store voicemail messages left for future retrieval using Top Level Telephone Number Voicemail Boxes 129.

Figure 2:
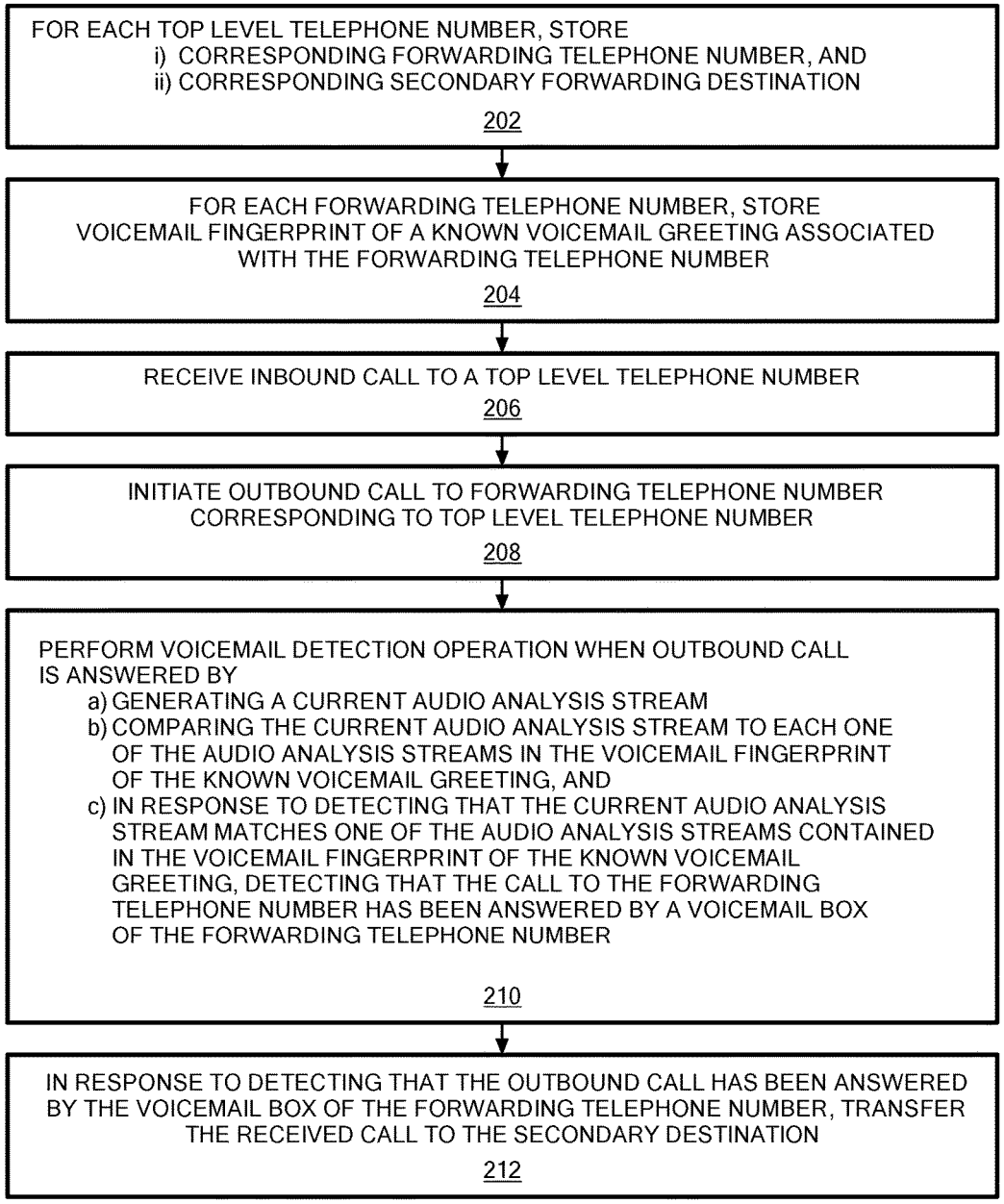
FIG. 2 is a flow chart showing an example of steps that may be performed by an illustrative embodiment.

FIG. 2 is a flow chart showing an example of steps that may be performed by the illustrative embodiment shown in FIG. 1. The steps of FIG. 2 may, for example, be performed by Auto-Attendant Logic 130 when Auto-Attendant Logic 130 is executed on Processing Circuitry 102, in order to use one or more voicemail fingerprints in Voicemail Fingerprints of Known Voicemail Greetings 118 to detect when an outbound call (e.g. one of Outgoing Calls 62) has been answered by voicemail. At step 202, for each one of the top level telephone numbers in Top Level Telephone Numbers 112, Auto-Attendant Logic 130 stores i) a corresponding forwarding telephone number in Forwarding Telephone Numbers 114, and ii) a corresponding secondary forwarding destination in Secondary Forwarding Destinations 116. At step 204, for each one of the forwarding telephone numbers in Forwarding Telephone Numbers 114, the disclosed system stores, in Voicemail Fingerprints of Known Voicemail Greetings 118, a voicemail fingerprint of a known voicemail greeting associated with that forwarding telephone number.

Each one of the voicemail fingerprints contained in Voicemail Fingerprints of Known Voicemail Greetings 118 is made up of a set of multiple audio analysis streams. The audio analysis streams in the set of audio analysis streams for a voicemail fingerprint contain audio characteristics of the known voicemail greeting associated with the forwarding telephone number associated with that voicemail fingerprint. Each audio analysis stream in the set contains audio characteristics of the known voicemail greeting beginning from a different temporal offset after the beginning of the known voicemail greeting. Accordingly, in an embodiment in which each voicemail fingerprint contains a set of five audio analysis streams, each one of the audio analysis streams contains audio analysis characteristics of the known voicemail greeting beginning from a corresponding one of five different temporal offsets from the beginning of the known voicemail greeting.

At step 206, an inbound call directed to one of the top level telephone numbers in Top Level Telephone Numbers 112 (e.g. one of Incoming Calls 52) is received by Auto-Attendant Server Computer 100. In response to receipt of the inbound call at step 206, Auto-Attendant Logic 130 retrieves the forwarding telephone number corresponding to the top level telephone number to which the inbound call was directed from Forwarding Telephone Numbers 114. At step 208 the Auto-Attendant Logic 130 automatically initiates an outbound call (i.e. one of Outgoing Calls 62) directed to the retrieved forwarding telephone number corresponding to the top level telephone number to which the inbound call was directed.

In response to the outbound call initiated at step 208 being answered, at step 210 Auto-Attendant Logic 130 performs a voicemail detection operation. The voicemail detection operation performed at step 210 includes generating a current audio analysis stream (e.g. Current Audio Analysis Stream 131) based on the audio received from the called device (e.g. one of Called Devices 60) beginning when the outbound call is answered. The audio analysis stream generated by Auto-Attendant Logic 130 contains audio characteristics of the audio received when the outbound call initiated at step 208 is answered.

The voicemail detection operation performed at step 210 also includes Auto-Attendant Logic 130 retrieving the voicemail fingerprint of the known voicemail greeting associated with the forwarding telephone number to which the outbound call initiated at step 208 was directed, e.g. from Voicemail Fingerprints of Known Voicemail Greetings 118, and comparing the generated current audio analysis stream to each one of the audio analysis streams in the retrieved voicemail fingerprint of the known voicemail greeting associated with the forwarding telephone number to which the outbound call was initiated.

The voicemail detection operation performed at step 210 further includes Auto-Attendant Logic 130 determining whether the generated current audio analysis stream matches one of the audio analysis streams contained in the retrieved voicemail fingerprint of the known voicemail greeting associated with the forwarding telephone number to which the outbound call was initiated. In response to detecting that the generated current audio analysis stream matches one of the audio analysis streams contained in the retrieved voicemail fingerprint of the known voicemail greeting associated with the forwarding telephone number to which the outbound call was initiated, Auto-Attendant Logic 130 detects that the outbound call directed to the forwarding telephone number has been answered by a voicemail box of the forwarding telephone number.

At step 212, in response to detecting that the outbound call directed to the forwarding telephone number has been answered by the voicemail box of the forwarding telephone number, Auto-Attendant Logic 130 immediately transfers the inbound call to the secondary destination corresponding to the top level telephone number to which the inbound call was directed. For example, in an embodiment or configuration in which the top level telephone number to which the inbound call was directed is a main number (e.g. a toll free number) of a business, the corresponding forwarding telephone number may be a personal telephone number (e.g. cell phone number) of an owner, employee or agent of the business, and the corresponding secondary destination may be a voicemail box (e.g. one of Top Level Telephone Number Voicemail Boxes 129) for the business associated with that top level telephone number. Accordingly, in such an example, in response to detecting that the outbound call initiated at step 208 has been answered by the voicemail box of the forwarding telephone number, e.g. by a personal telephone number of the owner, employee or agent of the business associated with the top level telephone number to which the inbound call was directed, the Auto-Attendant Logic 130 advantageously operates to immediately transfer the call to the voicemail box of the business associated with the top level telephone number to which the inbound call was directed (e.g. to one of Top Level Telephone Number Voicemail Boxes 129).

Because each one of the audio analysis streams in the voicemail fingerprint of the known voicemail greeting retrieved in step 210 contains audio characteristics beginning at a different temporal offset from the beginning of the known voicemail greeting associated with the forwarding telephone number to which the outbound call initiated at step 208 was directed, the disclosed system may advantageously provide accurate detection of when the outbound call initiated at step 208 is answered by the voicemail box of the forwarding telephone number, even in the face of differing levels of delay encountered when receiving audio after the outbound call is answered. High levels of detection accuracy may accordingly be maintained even in the face of varying audio delays resulting from factors such as communication network congestion, performance conditions on user devices and/or server systems, etc.

FIG. 3 shows an example of a voicemail fingerprint containing multiple audio analysis streams beginning at different temporal offsets from the beginning of a corresponding known voicemail greeting. As shown in FIG. 3, each one of the audio analysis streams 302, 304, 306, 308, and 310 contains audio characteristics of the known voicemail greeting beginning from a different temporal offset after the beginning 301 of the known voicemail greeting. Specifically, Audio Analysis Stream 0 302 contains audio characteristics of the known voicemail greeting starting from a temporal offset of 0 milliseconds after the beginning 301 of the known voicemail greeting, Audio Analysis Stream 1 304 contains audio characteristics of the known voicemail greeting starting from a temporal offset of 5 milliseconds after the beginning 301 of the known voicemail greeting, Audio Analysis Stream 2 306 contains audio characteristics of the known voicemail greeting starting from a temporal offset of 10 milliseconds after the beginning 301 of the known voicemail greeting, Audio Analysis Stream 3 308 contains audio characteristics of the known voicemail greeting starting from a temporal offset of 15 milliseconds after the beginning 301 of the known voicemail greeting, and Audio Analysis Stream 4 320 contains audio analysis characteristics of the known voicemail greeting starting from a temporal offset of 20 milliseconds after the beginning 301 of the known voicemail greet. Accordingly, the five different temporal offsets from the beginning 301 of the known voicemail greeting in the example Voicemail Fingerprint 300 are 0, 5, 10, 15, and 20 milliseconds. Each one of the temporal offsets in the example Voicemail Fingerprint 300 is a multiple of a constant time factor of five (5), i.e. 0 equals five multiplied by 0, 5 equals five multiplied by 1, 10 equals five multiplied by 2, 15 equals five multiplied by 3, and 20 equals 5 multiplied by 4. Those skilled in the art will recognize that the specific number of audio analysis streams in the example of Voicemail Fingerprint 300 is only given for purposes of explanation, that the disclosed techniques are not limited to using the specific number of audio analysis streams shown in Voicemail Fingerprint 300, and that the disclosed techniques are applicable to other embodiments or configurations using other specific numbers of audio analysis streams. In addition, those skilled in the art will also recognize that the specific temporal offsets shown in the example of Voicemail Fingerprint 300 are given only for purposes of explanation and illustration, and that the disclosed techniques are applicable to other embodiments or configurations using different specific temporal offsets for the audio analysis streams in the voicemail fingerprints. Further, those skilled in the art will also recognize that the disclosed techniques are not limited to using the specific constant time factor used in Voicemail Fingerprint 300, and that the disclosed techniques are applicable to other embodiments or configurations using other specific constant time factors.

Also in the example of FIG. 3, and as illustrated by Voicemail Fingerprint 300, the audio characteristics contained in each one of the set of audio analysis streams 302, 304, 306, 308 and 310 may be organized as a series of audio characteristic "chunks". Each one of the audio characteristic chunks in an audio analysis stream contained in a voicemail fingerprint of a known voicemail greeting contains at least one value representing at least one audio characteristic of a corresponding time period within the known voicemail greeting. In the example of Voicemail Fingerprint 300, each chunk corresponds to a time period of 25 milliseconds within the corresponding known voicemail greeting. For example, as shown in FIG. 3, Chunk 0 of Audio Analysis Stream 0 302 corresponds to a time period consisting of the first 25 milliseconds of the known voicemail recording, Chunk 1 of Audio Analysis Stream 0 302 corresponds to a time period consisting of the second 25 milliseconds of the known voicemail recording, Chunk 2 of Audio Analysis Stream 0 302 corresponds to a time period consisting of the third 25 milliseconds of the known voicemail recording, and so on for the remaining chunks in Audio Analysis Stream 0 302. Chunk 0 of Audio Analysis Stream 1 304 corresponds to a time period consisting of the 25 milliseconds of the known voicemail recording beginning after a 5 millisecond temporal offset from the beginning 301 of the known voicemail recording (e.g. milliseconds 6 through 30 of the known voicemail recording), Chunk 1 of Audio Analysis Stream 1 304 corresponds to a time period consisting of the next 25 milliseconds of the known voicemail recording (e.g. milliseconds 31 through 55 of the known voicemail recording), Chunk 2 of Audio Analysis Stream 1 304 corresponds to the next 25 milliseconds of the known voicemail recording (e.g. milliseconds 56 through 80 of the known voicemail recording), and so on for the remaining chunks in Audio Analysis Stream 1 304. Chunk 0 of Audio Analysis Stream 2 306 corresponds to a time period consisting of the 25 milliseconds of the known voicemail recording beginning after a 10 millisecond temporal offset from the beginning 301 of the known voicemail recording (e.g. milliseconds 11 through 35 of the known voicemail recording), Chunk 1 of Audio Analysis Stream 2 306 corresponds to a time period consisting of the next 25 milliseconds of the known voicemail recording (e.g. milliseconds 36 through 60 of the known voicemail recording), Chunk 2 of Audio Analysis Stream 2 306 corresponds to the next 25 milliseconds of the known voicemail recording (e.g. milliseconds 61 through 85 of the known voicemail recording), and so on for the remaining chunks in Audio Analysis Stream 2 306. Chunk 0 of Audio Analysis Stream 3 308 corresponds to a time period consisting of the 25 milliseconds of the known voicemail recording beginning after a 15 millisecond temporal offset from the beginning 301 of the known voicemail recording (e.g. milliseconds 16 through 40 of the known voicemail recording), Chunk 1 of Audio Analysis Stream 3 308 corresponds to a time period consisting of the next 25 milliseconds of the known voicemail recording (e.g. milliseconds 41 through 65 of the known voicemail recording), Chunk 2 of Audio Analysis Stream 3 308 corresponds to the next 25 milliseconds of the known voicemail recording (e.g. milliseconds 66 through 90 of the known voicemail recording), and so on for the remaining chunks in Audio Analysis Stream 3 308. Chunk 0 of Audio Analysis Stream 4 310 corresponds to a time period consisting of the 25 milliseconds of the known voicemail recording beginning after a 20 millisecond temporal offset from the beginning 301 of the known voicemail recording (e.g. milliseconds 21 through 45 of the known voicemail recording), Chunk 1 of Audio Analysis Stream 4 310 corresponds to a time period consisting of the next 25 milliseconds of the known voicemail recording (e.g. milliseconds 46 through 70 of the known voicemail recording), Chunk 2 of Audio Analysis Stream 4 310 corresponds to the next 25 milliseconds of the known voicemail recording (e.g. milliseconds 71 through 95 of the known voicemail recording), and so on for the remaining chunks in Audio Analysis Stream 4 310.

The total number of audio characteristic chunks in each audio analysis stream of Voicemail Fingerprint 300 may be implementation specific and/or a configurable value. For example, each audio analysis stream of Voicemail Fingerprint 300 may contain a number of audio characteristic chunks sufficient to represent between 2 and 7 seconds of the known voicemail greeting.

The audio characteristics in the current audio analysis stream (e.g. Current Audio Analysis Stream 131) may also be made up of a series of audio characteristic chunks. In other words, the current audio analysis stream may have a format that is the same as the format of the audio analysis streams shown in the Voicemail Fingerprint 300. Accordingly, each one of the audio characteristic chunks in the current audio analysis stream may contain at least one value representing at least one audio characteristic of the audio in a corresponding time period within the audio received beginning when the call to the forwarding telephone number was answered. For example, in an embodiment or configuration in which the voicemail fingerprints of known voicemail greetings (e.g. Voicemail Fingerprints of Known Voicemail Greetings 118) have the format of Voicemail Fingerprint 300 shown in FIG. 3, each one of the audio characteristic chunks in the current audio analysis stream would contain at least one value representing at least one audio characteristic of the audio in a corresponding 25 millisecond time period within the audio received beginning when the call to the forwarding telephone number was answered. Specifically, in such an embodiment or configuration, a first chunk (e.g. chunk 0) of the current audio analysis stream corresponds to a time period consisting of the first 25 milliseconds of the audio received beginning when the call to the forwarding telephone number was answered, a second chunk (e.g. chunk 1) of the current audio analysis stream corresponds to a time period consisting of the second 25 milliseconds of the audio received beginning when the call to the forwarding telephone number was answered, a third chunk (e.g. chunk 2) of the current audio analysis stream corresponds to a time period consisting of the third 25 milliseconds of the audio received beginning when the call to the forwarding telephone number was answered, and so on for the remaining chunks in the current audio analysis stream.

The total number of audio characteristic chunks in the current audio analysis stream may also be implementation specific and/or a configurable value or setting. For example, the current audio analysis stream may also contain a number of audio characteristic chunks sufficient to represent between 2 and 7 seconds of the audio received beginning when the call to the forwarding telephone number was answered.

As shown in FIG. 3, the time periods in the known voicemail greeting that are represented by corresponding individual chunks in the audio analysis streams 302, 304, 306, 308 and 310 may be of equal duration. For example, the time periods in the known voicemail greeting represented by individual corresponding chunks may each be 25 milliseconds in length. Similarly, the time periods in the audio received beginning when the call to the forwarding telephone number was answered may be of equal duration. For example, the time periods in the audio received beginning when the call to the forwarding telephone number was answered, and represented by corresponding individual chunks in the current audio analysis stream, may be 25 milliseconds in length. In addition, the time periods in the known voicemail greeting represented by individual chunks in the audio analysis streams 302, 304, 306, 308 and 310 may have the same duration as the time periods in the audio received beginning when the call to the forwarding telephone number was answered that are each represented by a corresponding chunk in the current audio analysis stream.

Further, the duration of the time periods in the known voicemail greeting represented by individual chunks in the audio analysis streams 302, 304, 306, 308 and 310 may be a multiple of the same constant time factor described above with regard to the temporal offsets of the audio analysis streams in the Voicemail Fingerprint 300. For example, when the duration of the time periods in the known voicemail greeting represented by individual chunks in the audio analysis streams 302, 304, 306, 308 and 310 is 25 milliseconds, then the duration of those time periods is a multiple of a constant time factor of 5. Similarly, the duration of the time periods in the audio received beginning when the call to the forwarding telephone number was answered, that are each represented by a corresponding chunk in the current audio analysis stream, may also a multiple of the same constant time factor. For example, when the duration of the time periods in the audio received beginning when the call to the forwarding telephone number was answered, that are each represented by a corresponding chunk in the current audio analysis stream, is 25 milliseconds, then the duration of those time periods is also a multiple of a constant time factor of 5.

In one embodiment, each one of the audio characteristic chunks in the audio analysis streams in Voicemail Fingerprint 300 contains a value representing a maximum volume in the audio contained in the corresponding time period within the known voicemail greeting, and a value representing a strongest frequency in the audio contained in the corresponding time period within the known voicemail greeting. Similarly, each one of the audio characteristic chunks in the current audio analysis stream (e.g. Current Audio Analysis Stream 131) may contain a value representing a maximum volume in the audio contained in the corresponding time period within the audio received beginning when the call to the forwarding telephone number was answered, and a value representing a strongest frequency in the audio contained in the corresponding time period within the audio received beginning when the call to the forwarding telephone number was answered.

In an embodiment in which the audio characteristics in the streams of the voicemail fingerprints of known voicemail greetings are made up of a series of audio characteristic chunks, and in which the audio characteristics in the current audio analysis stream are also made up of a series of audio characteristic chunks, the comparison of the current audio analysis stream to each one of the audio analysis streams in the voicemail fingerprint of the known voicemail greeting in step 210 of FIG. 2 may be performed on a chunk by chunk basis for each one of the audio analysis streams in the voicemail fingerprint of the known voicemail greeting. In such an embodiment, in response to detecting that the values in at least a threshold minimum number or percentage of chunks in the current audio analysis stream match the values in the corresponding chunks of one of the audio analysis streams in the voicemail fingerprint of the known voicemail greeting (e.g. that 90% or some other predetermined threshold percentage of the corresponding chunks match), Auto-Attendant Logic 130 detects that the current audio analysis stream matches that one of the audio analysis streams in the voicemail fingerprint of the known voicemail greeting, and as a result also detects that the call to the forwarding telephone number has been answered by a voicemail box of the forwarding telephone number.

FIG. 4 is a flow chart showing an example of steps that may be performed to store voicemail fingerprints of known voicemail greetings, by collecting the voicemail greetings of mobile network operators (also known as wireless service providers, wireless carriers, cellular companies, and/or mobile network carriers), and then generating voicemail fingerprints using the collected voicemail greetings. Mobile network operators provide wireless services to subscribing cell phone users, and typically provide a voicemail box service to each subscriber. The voicemail box service provided by a mobile network operator often uses a standard voicemail greeting that is the same for all subscribers to the mobile network operator, but that is distinctive and unique for that mobile network operator. The steps of FIG. 4 may, for example, be performed by the Auto-Attendant Logic 130 shown in FIG. 1 when executed on the Processing Circuitry 102.

As shown in FIG. 4, at step 402, Auto-Attendant Logic 130 collects the standard voicemail greetings of one or more mobile network operators. The collection performed at step 402 may include, for each one of the mobile network operators, calling a telephone number of a mobile phone serviced by that mobile network operator, allowing the call to be forwarded to voicemail, and recording the resultant voicemail greeting. In this way a voicemail greeting may be recorded for each one of the mobile network operators.

At step 404, the Auto-Attendant Logic 130 generates a voicemail fingerprint for each one of the voicemail greetings collected at step 402. The voicemail fingerprints generated at step 404 may, for example, have the format of Voicemail Fingerprint 300 shown in FIG. 3.

At step 406, the Auto-Attendant Logic 130 stores the voicemail fingerprints generated at step 404 as voicemail fingerprints of known voicemail greetings, e.g. in Voicemail Fingerprints of Known Voicemail Greetings 118. In one embodiment, Auto-Attendant Logic 130 may store the complete set of voicemail fingerprints generated at step 404 as voicemail fingerprints for known voicemail greetings, e.g. in Voicemail Fingerprints of Known Voicemail Greetings 118, such that all voicemail fingerprints generated at step 404 are used as voicemail fingerprints of known voicemail greetings with regard to each one of the forwarding telephone numbers in Forwarding Telephone Numbers 114. In such an embodiment, for a call to any one of the forwarding telephone numbers in Forwarding Telephone Numbers 114, each one of the voicemail fingerprints generated at step 404 is compared to Current Audio Analysis Stream 131 to determine whether the call has been answered by voicemail. Alternatively, the voicemail fingerprint generated from a recording of the voicemail greeting of one mobile network operator may be stored in Voicemail Fingerprints of Known Voicemail Greetings 118 as the voicemail fingerprint of a known voicemail greeting for each forwarding telephone number of a mobile phone (e.g. within Called Devices 60) that is serviced by that mobile network operator, the voicemail fingerprint generated from a recording of the voicemail greeting of another mobile network operator may be stored in Voicemail Fingerprints of Known Voicemail Greetings 118 as the voicemail fingerprint of a known voicemail greeting for each forwarding telephone number of a mobile phone (e.g. within Called Devices 60) that is serviced by that mobile network operator, and so on for each mobile network operator.

FIG. 5 is a flow chart showing another example of steps that may be performed to store voicemail fingerprints, by automatically training the disclosed system based on processing outbound calls to forwarding telephone numbers that lack corresponding voicemail fingerprints in Voicemail Fingerprints of Known Voicemail Greetings 118. The steps of FIG. 5 may, for example, be performed by the Auto-Attendant Logic 130 shown in FIG. 1 when executed on the Processing Circuitry 102.

At step 502, Auto-Attendant Logic 130 detects that no voicemail fingerprint of a known voicemail greeting is stored in Voicemail Fingerprints of Known Voicemail Greetings 118 for a forwarding telephone number in Forwarding Telephone Numbers 114 number, for example when initiating a first outbound call (e.g. one of Outgoing Calls 62) to that forwarding telephone number. In response to detecting at step 502 that no voicemail fingerprint of a known voicemail greeting is stored for the forwarding telephone number, at step 504 Auto-Attendant Logic 130 performs a candidate voicemail fingerprint generation operation for the forwarding telephone number by a) recording audio received beginning when the first outbound call to the forwarding telephone number is answered, and b) in response to detecting that a requested user input was not received prior to expiration of a time out period following the first outbound call to the forwarding telephone number being answered, determining that the first outbound call was answered by a voicemail box, and generating a candidate voicemail fingerprint using the recording of the audio received beginning when the first outbound call to the forwarding telephone number was answered. The requested user input may, for example, be a keypad selection that is requested to accept the call, e.g. pressing "1" to accept the call. Alternatively, the requested user input may, for example, be a voice input that is requested to accept the call, e.g. saying "accept" to accept the call.

At step 506, after performing the candidate voicemail generation operation at step 504, the disclosed system may perform a voicemail fingerprint confirmation operation for the forwarding telephone number by a) recording audio received beginning when a second outbound call (e.g. another one of Outgoing Calls 62) to the forwarding number is answered, b) in response to detecting that a requested user input was not received prior to expiration of a time out period following the second call to the forwarding telephone number being answered, determining that the second outbound call was answered by a voicemail box, and generating a new voicemail fingerprint based on the recording of the audio received beginning when the second call to the forwarding telephone number was answered, c) comparing the new voicemail fingerprint to the candidate voicemail fingerprint, and d) in response to the new voicemail fingerprint matching the candidate voicemail fingerprint, storing the candidate fingerprint (e.g. in Voicemail Fingerprints of Known Voicemail Greetings 118) as the voicemail fingerprint of a known voicemail greeting corresponding to the forwarding telephone number. Similarly as in step 504, the requested user input may, for example, be a keypad selection that is requested to accept the call, e.g. pressing "1" to accept the call, or alternatively, the requested user input may, for example, be a voice input that is requested to accept the call, e.g. saying "accept" to accept the call.

FIG. 6 is a flow chart showing another example of steps that may be performed to store voicemail fingerprints, in response to a system administrator command to reset a voicemail fingerprint for a specific forwarding telephone number. A system administrator command may, for example, be received in response to a request to reset a voicemail fingerprint for a specific forwarding telephone number, when the operator/owner of the phone for that forwarding telephone number has recently changed their voicemail greeting. The steps of FIG. 5 may, for example, be performed by the Auto-Attendant Logic 130 shown in FIG. 1 when executed on the Processing Circuitry 102.

At step 602, the Auto-Attendant Logic 130 receives a system administrator command, such as System Administrator Command 133 shown in FIG. 1. The system administrator command indicates a specific forwarding telephone number for which the corresponding voicemail fingerprint of a known voicemail greeting is to be reset. The system administrator command may, for example, be received through Communication Interface(s) 104 from a separate system administrator computer, or through a user interface generated by Auto-Attendant Logic 130 within a display device of Auto-Attendant Server Computer 100. When the system administrator command is issued, the operator/owner of the phone for the forwarding telephone number is contacted and instructed to allow a subsequent call to the forwarding telephone number to be answered by voicemail.

At step 604, Auto-Attendant Logic 130 initiates an outbound call to the forwarding telephone number indicated by the system administrator command received at step 602. The outbound call initiated at step 604 is answered by voicemail, since the owner/operator of the phone has agreed to allow the call to be forwarded to the voicemail box for the phone. At step 606, Auto-Attendant Logic 130 simply begins recording when the call is answered, and as a result the voicemail greeting is recorded by Auto-Attendant Logic 130. Auto-Attendant Logic 130 then uses the recorded audio containing the voicemail greeting to generate a new voicemail fingerprint, that is then stored as the voicemail fingerprint of a known voicemail greeting corresponding to the forwarding telephone number. The new voicemail fingerprint generated at step 606 may, for example, have the format of Voicemail Fingerprint 300 shown in FIG. 3.

FIG. 7 is a flow chart showing an example of steps that may be performed to generate an audio analysis stream. The steps of FIG. 7 may, for example, be performed by Auto-Attendant Logic 130 when executed on Processing Circuitry 102. The steps of FIG. 7 result in generation of a single audio characteristic chunk, and are repeated as necessary to generate each chunk contained in a complete audio analysis stream.

At step 702, audio (e.g. digitized audio data) is received by and buffered within Auto-Attendant Logic 130 until the amount of audio buffered for analysis is equal to the duration of the time period represented by a single chunk (e.g. until 25 milliseconds of audio is buffered). The steps of FIG. 7 may be used with any audio for which an audio analysis stream is to be generated. For example, in the case of generating an audio analysis stream for a voicemail fingerprint of a known voicemail greeting to be stored in Voicemail Fingerprints of Known Voicemail Greetings 118, the received audio is the known voicemail greeting (e.g. a voicemail greeting of a mobile network operator, audio recorded when the forwarding telephone number lacks a voicemail fingerprint and an outbound call to the forwarding telephone number is determined to have been answered by voicemail box, etc.). In another example, in the case of generating the current audio analysis stream, the received audio is the audio received beginning when an outbound call to a forwarding telephone number is answered.

At step 704, a maximum volume of the audio stored in the buffer is calculated, e.g. in decibels. At step 706, the maximum volume calculated at step 704 in decibels may be converted to a loudness ratio between 0 and 1, with 1 representing the loudest noise possible on a digital phone line. The loudness ratio calculated in step 706 is an example of one possible representation of the maximum volume of the audio stored in the buffer.

At step 708, a Hamming window function is applied to the audio stored in the buffer, and at step 710 a Hilbert transform is applied to the buffer, after which at step 712 the strongest frequency in the buffered audio is calculated. The strongest frequency calculated at step 712 is the most significant/loudest frequency present the buffered audio measured in Hertz.

At step 714, the loudness ratio calculated at step 706 is stored into the audio characteristic chunk as a value representing the maximum volume of the buffered audio. Further at step 714, the strongest frequency calculated at step 712 is stored into the audio characteristic chunk as a value representing the strongest frequency of the buffered audio.

Figure 8:
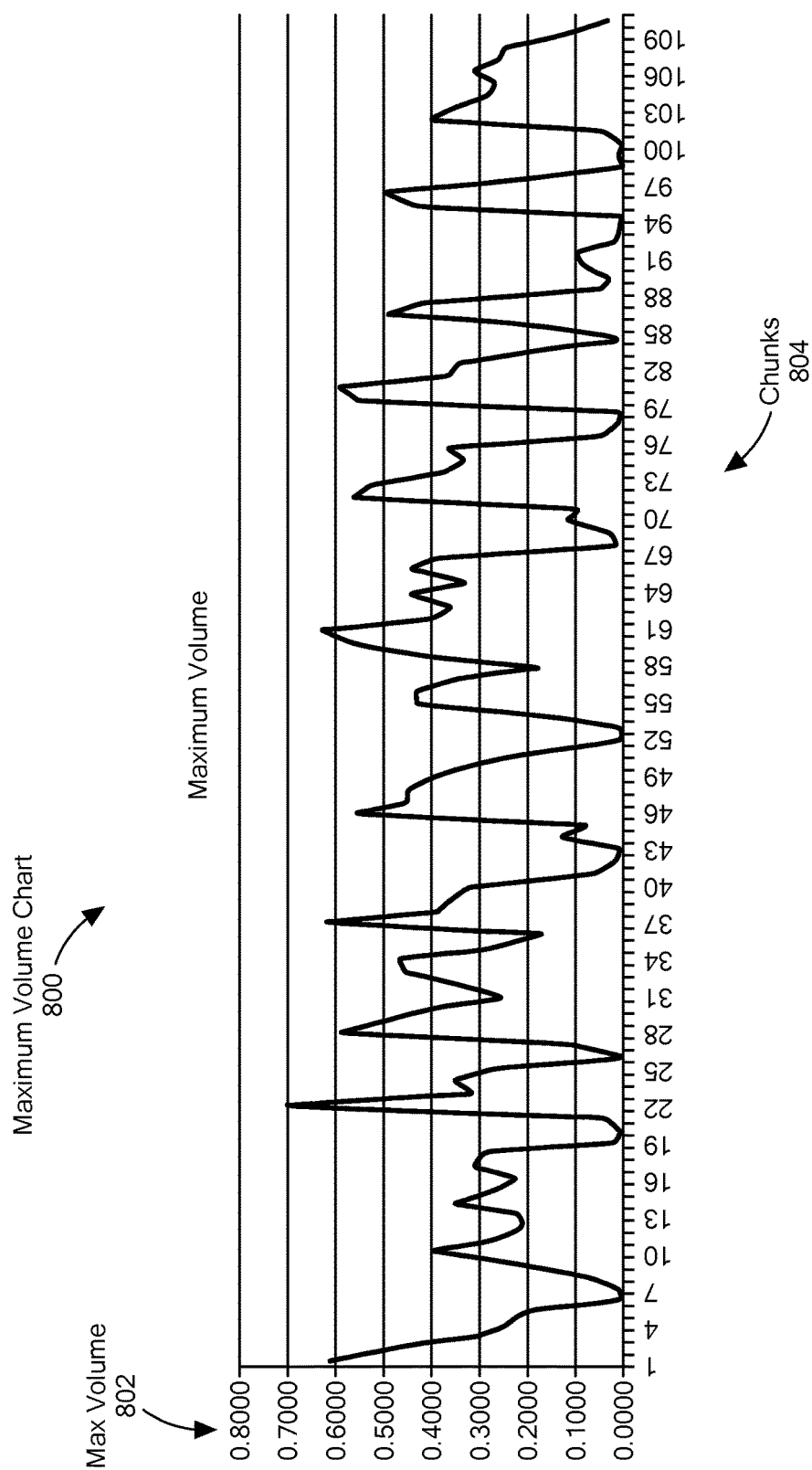
FIG. 8 is a chart showing a maximum volume audio characteristic of an example audio analysis stream.

FIG. 8 shows a Maximum Volume Chart 800 of maximum volume values within the audio characteristic chunks of an example of an audio analysis stream. In the Maximum Volume Chart 800, the y axis is the maximum volume 802, and the x axis is given in terms of the audio characteristic chunks 804 of the audio analysis stream. In the example of FIG. 8, the maximum volume 802 is shown as a loudness ratio between 0 and 1, with 1 representing the loudest noise possible on a digital phone line.

Figure 9:
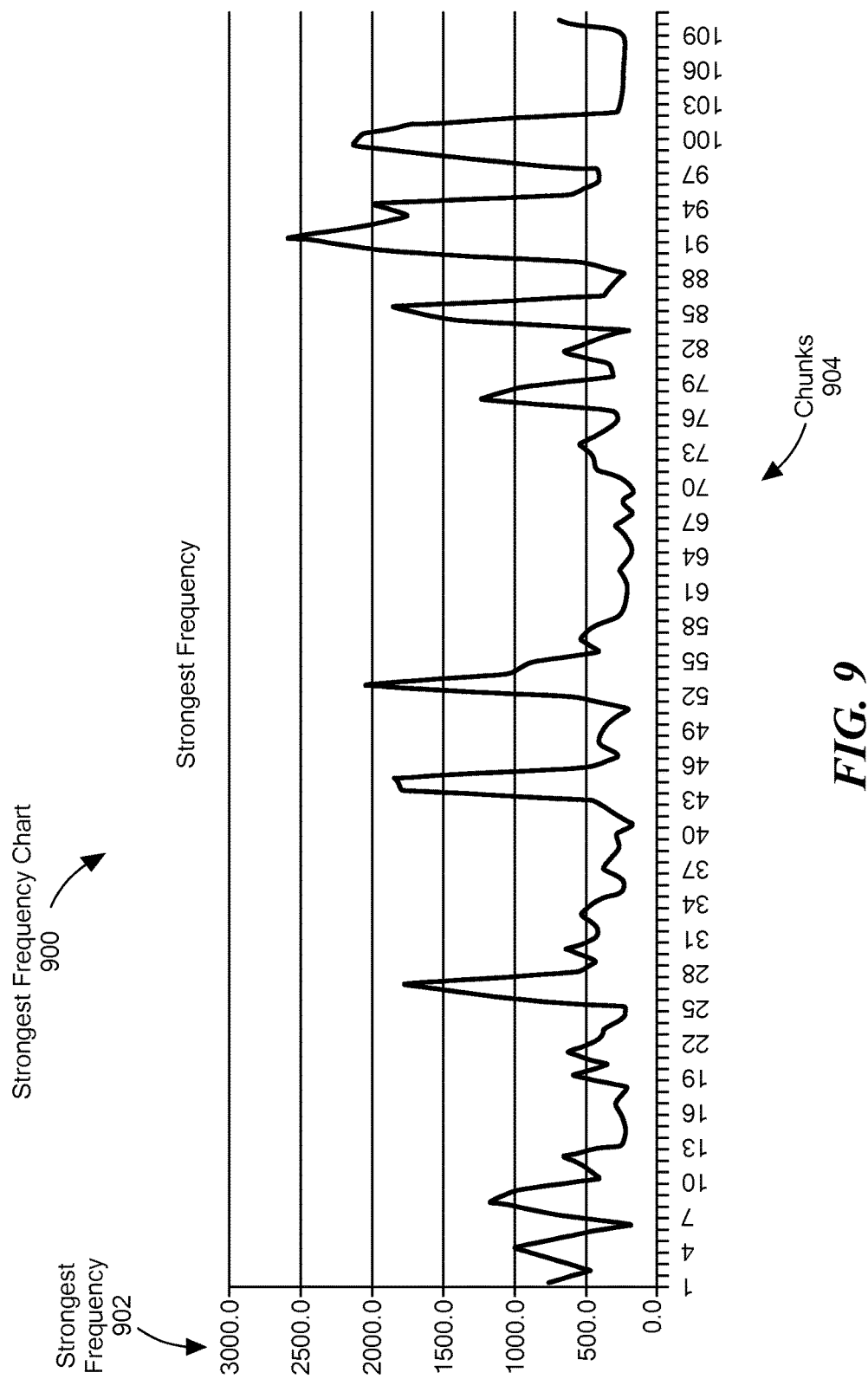
FIG. 9 is a chart showing a strongest frequency audio characteristic of the example audio analysis stream.

FIG. 9 shows a Strongest Frequency Chart 900 of strongest frequency values within the audio characteristic chunks of the audio analysis stream also illustrated in FIG. 8. In the Strongest Frequency Chart 800, the y axis is the strongest frequency 902, and the x axis is given in terms of the audio characteristic chunks 904 of the audio analysis stream. The audio characteristic chunks 904 correspond to the audio characteristic chunks 804 shown in FIG. 8. In the example of FIG. 9, the strongest frequency 902 is shown in Hertz.

Table 1 below shows an example of specific values stored for maximum volume and strongest frequency in the audio characteristic chunks of the audio analysis stream illustrated in FIGS. 8 and 9.

TABLE 1

| Chunk # | Maximum Volume | Strongest Frequency |
|---|---|---|
| 0 | 0.6114 | 751.0 |
| 1 | 0.4795 | 467.6 |
| 2 | 0.3122 | 752.3 |
| 3 | 0.2442 | 999.0 |
| 4 | 0.2075 | 650.6 |
| 5 | 0.0086 | 184.0 |
| 6 | 0.0148 | 716.8 |
| 7 | 0.0872 | 1167.0 |
| 8 | 0.2136 | 984.2 |
| 9 | 0.3962 | 400.9 |
| 10 | 0.2621 | 501.1 |
| 11 | 0.2102 | 650.8 |
| 12 | 0.2194 | 251.1 |
| 13 | 0.3512 | 217.4 |
| 14 | 0.2683 | 234.2 |
| 15 | 0.2202 | 284.0 |
| 16 | 0.3059 | 283.9 |
| 17 | 0.2939 | 217.5 |
| 18 | 0.0120 | 583.2 |
| 19 | 0.0077 | 350.7 |
| 20 | 0.0435 | 617.3 |
| 21 | 0.6985 | 400.8 |
| 22 | 0.3171 | 384.1 |
| 23 | 0.3480 | 234.0 |
| 24 | 0.2630 | 217.5 |
| 25 | 0.0097 | 1160.9 |
| 26 | 0.1094 | 1767.0 |
| 27 | 0.5814 | 550.7 |
| 28 | 0.4906 | 434.1 |
| 29 | 0.3921 | 634.3 |
| 30 | 0.2561 | 434.2 |
| 31 | 0.3421 | 434.0 |
| 32 | 0.4555 | 534.1 |
| 33 | 0.4632 | 451.8 |
| 34 | 0.2822 | 250.1 |
| 35 | 0.1721 | 234.7 |
| 36 | 0.6151 | 367.3 |
| 37 | 0.3874 | 317.0 |
| 38 | 0.3589 | 267.2 |
| 39 | 0.3207 | 284.1 |
| 40 | 0.0618 | 184.2 |
| 41 | 0.0174 | 317.2 |
| 42 | 0.0000 | 465.4 |
| 43 | 0.1250 | 1784.6 |
| 44 | 0.0773 | 1834.4 |
| 45 | 0.5541 | 434.0 |
| 46 | 0.4521 | 267.4 |
| 47 | 0.4464 | 400.8 |
| 48 | 0.3818 | 384.4 |
| 49 | 0.2995 | 334.1 |
| 50 | 0.1878 | 200.8 |
| 51 | 0.0000 | 583.2 |
| 52 | 0.0000 | 2034.7 |
| 53 | 0.1388 | 1034.9 |
| 54 | 0.4299 | 883.8 |
| 55 | 0.4304 | 400.5 |
| 56 | 0.3484 | 534.3 |
| 57 | 0.1801 | 467.4 |
| 58 | 0.4000 | 267.5 |
| 59 | 0.5607 | 234.1 |
| 60 | 0.6286 | 217.5 |
| 61 | 0.4001 | 217.6 |
| 62 | 0.3564 | 251.9 |
| 63 | 0.4408 | 200.9 |
| 64 | 0.3321 | 184.3 |
| 65 | 0.4404 | 217.5 |
| 66 | 0.3889 | 284.1 |
| 67 | 0.0132 | 184.1 |
| 68 | 0.0257 | 234.2 |
| 69 | 0.1143 | 167.5 |
| 70 | 0.0938 | 217.4 |
| 71 | 0.5593 | 434.0 |
| 72 | 0.5235 | 450.9 |
| 73 | 0.3715 | 534.2 |
| 74 | 0.3338 | 401.3 |
| 75 | 0.3586 | 284.2 |
| 76 | 0.0470 | 284.2 |
| 77 | 0.0084 | 1216.8 |
| 78 | 0.0102 | 900.8 |
| 79 | 0.5554 | 317.4 |
| 80 | 0.5905 | 334.2 |
| 81 | 0.3642 | 650.7 |
| 82 | 0.3410 | 452.7 |
| 83 | 0.1901 | 201.0 |
| 84 | 0.0092 | 1421.2 |
| 85 | 0.1590 | 1834.8 |
| 86 | 0.4865 | 384.2 |
| 87 | 0.4004 | 317.5 |
| 88 | 0.0485 | 234.4 |
| 89 | 0.0313 | 572.1 |
| 90 | 0.0859 | 1901.0 |
| 91 | 0.0983 | 2577.7 |
| 92 | 0.0155 | 2067.0 |

TABLE 1-continued

| Chunk # | Maximum Volume | Strongest Frequency |
|---|---|---|
| 93 | 0.0106 | 1767.7 |
| 94 | 0.0087 | 1968.4 |
| 95 | 0.4322 | 600.9 |
| 96 | 0.4949 | 400.7 |
| 97 | 0.2123 | 416.3 |
| 98 | 0.0033 | 1285.6 |
| 99 | 0.0102 | 2120.9 |
| 100 | 0.0035 | 2076.7 |
| 101 | 0.0433 | 1684.0 |
| 102 | 0.3949 | 267.1 |
| 103 | 0.3440 | 250.9 |
| 104 | 0.2793 | 250.7 |
| 105 | 0.2701 | 234.2 |
| 106 | 0.3092 | 234.3 |
| 107 | 0.2596 | 237.8 |
| 108 | 0.2455 | 234.3 |
| 109 | 0.1166 | 267.5 |
| 110 | 0.0381 | 667.6 |

Those skilled in the art will recognize that various modifications may be made to the disclosed technology. For example, while the above description describes embodiments which use maximum volume and strongest frequency as audio characteristics, the disclosed techniques are not limited to such an approach. Accordingly, the disclosed techniques may alternatively be embodied using one or more other audio characteristics instead of or in addition to maximum volume and/or strongest frequency.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention.

It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A method of detecting voicemail greetings using voicemail fingerprints, the method comprising:
storing, for each one of a plurality of top level telephone numbers, i) a corresponding forwarding telephone number, and ii) a corresponding secondary forwarding destination; for each one of the forwarding telephone numbers, storing a voicemail fingerprint of a known voicemail greeting, the voicemail fingerprint made up of a plurality of audio analysis streams, each one of the audio analysis streams containing audio characteristics of the known voicemail greeting associated with the forwarding telephone number beginning from a respective one of a plurality of different temporal offsets from the beginning of the known voicemail greeting;
in response to receipt of a call to one of the top level telephone numbers,
i) initiating a call to the forwarding telephone number corresponding to the top level telephone number, and
ii) performing a voicemail detection operation by a) generating a current audio analysis stream containing audio characteristics of audio received beginning when the call to the forwarding telephone number is answered, b) comparing the current audio analysis stream to each one of the audio analysis streams in the voicemail fingerprint of the known voicemail greeting associated with the forwarding telephone number, and c) in response to detecting that the current audio analysis stream matches one of the audio analysis streams contained in the voicemail fingerprint for the known voicemail greeting associated with the forwarding telephone number, detecting that the call to the forwarding telephone number has been answered by a voicemail box of the forwarding telephone number; and
in response to detecting that the call to the forwarding telephone number has been answered by the voicemail box of the forwarding telephone number, transferring the received call to the secondary destination corresponding to the top level telephone number.

2. The method of claim 1, further comprising:
wherein the audio characteristics in each of the audio analysis streams in the voicemail fingerprint comprise a series of audio characteristic chunks, and wherein each audio characteristic chunk in the audio analysis streams in the voicemail fingerprint contains at least one value representing at least one audio characteristic of a corresponding one of a plurality of equal length time periods within the known voicemail greeting; and
wherein the audio characteristics in the current audio analysis stream comprise a series of audio characteristic chunks, and wherein each audio characteristic chunk in the current audio analysis stream contains at least one value representing at least one audio characteristic of a corresponding one of a plurality of equal length time periods within the audio received beginning when the call to the forwarding telephone number was answered.

3. The method of claim 2, further comprising:
wherein each audio characteristic chunk in the audio analysis streams contains a value representing a maximum volume and a value representing a strongest frequency in the corresponding one of the plurality of equal length time periods in the known voicemail greeting; and
wherein each audio characteristic chunk in the current audio analysis stream contains a value representing a maximum volume and a value representing a strongest frequency in the corresponding one of the plurality of equal length time periods in the audio received beginning when the call to the forwarding telephone number was answered.

4. The method of claim 1, wherein storing a voicemail fingerprint of a known voicemail greeting further comprises:
recording a voicemail greeting of at least one mobile network operator;
generating a voicemail fingerprint for the recorded voicemail greeting of the mobile network operator; and
storing the voicemail fingerprint of the mobile network operator as a voicemail fingerprint of a known voicemail greeting corresponding to at least one forwarding telephone number.

5. The method of claim 1, wherein storing a voicemail fingerprint of a known voicemail greeting further comprises:
in response to detecting that a voicemail fingerprint is not stored for one of the forwarding telephone numbers,
performing a candidate voicemail fingerprint generation operation for the forwarding telephone number by a) recording audio received beginning when a first call to the forwarding telephone number is answered, b) in response to detecting that a requested user input was not received prior to expiration of a time out period following the first call to the forwarding telephone number being answered, determining that the first call was answered by a voicemail box of the forwarding telephone number and generating the candidate voicemail fingerprint based on the recording of the audio received beginning when the first call to the forwarding telephone number is answered; and
performing a voicemail fingerprint confirmation operation for the forwarding telephone number by a) recording audio received beginning when a second call to the forwarding number is answered, b) in response to detecting that a requested user input was not received prior to expiration of a time out period following the second call to the forwarding telephone number being answered, determining that the second call was answered by the voicemail box of the forwarding telephone number and generating a new voicemail fingerprint based on the recording of the audio received beginning when the second call to the forwarding telephone number is answered, c) comparing the new voicemail fingerprint to the candidate voicemail fingerprint, and d) in response to the new voicemail fingerprint matching the candidate voicemail fingerprint, storing the candidate as the voicemail fingerprint of the known voicemail greeting for the forwarding telephone number.

6. The method of claim 1, wherein storing a voicemail fingerprint of a known voicemail greeting further comprises:
in response to receipt of a system administrator command to reset the voicemail fingerprint corresponding to a forwarding telephone number specified by the system administrator command, a) initiating a call to the forwarding telephone number specified by the system administrator command, b) generating a voicemail fingerprint using the audio received when the call to the forwarding telephone number specified by the system administrator command is answered, and c) storing the voicemail fingerprint as the voicemail fingerprint of a known voicemail greeting corresponding to the forwarding telephone number specified in the system administrator command.

7. The method of claim 3, wherein each one of the equal length time periods within the known voicemail greeting, and each one of the equal length time periods within the audio received beginning when the call to the forwarding telephone number was answered, have the same duration.

8. The method of claim 7, wherein each one of the plurality of different temporal offsets within the known voicemail greeting is equal to a multiple of a constant time factor; and
wherein the duration of the equal length time periods within the known voicemail greeting, and of the equal length time periods within the audio received beginning when the call to the forwarding telephone number was answered have a duration that is a multiple of the constant time factor.

9. An electronic device, comprising: processing circuitry; and memory communicably coupled to the processing circuitry, the memory storing program code for detecting voicemail greetings using voicemail fingerprints, wherein the program code, when executed by the processing circuitry, causes the processing circuitry to: store, in the memory, for each one of a plurality of top level telephone numbers, i) a corresponding forwarding telephone number, and ii) a corresponding secondary forwarding destination,
store, in the memory for each one of the forwarding telephone numbers, a voicemail fingerprint of a known voicemail greeting, the voicemail fingerprint made up of a plurality of audio analysis streams, each one of the audio analysis streams containing audio characteristics of the known voicemail greeting associated with the forwarding telephone number beginning from a respective one of a plurality of different temporal offsets from the beginning of the known voicemail greeting,
in response to receipt of a call to one of the top level telephone numbers,
i) initiate a call to the forwarding telephone number corresponding to the top level telephone number, and ii) perform a voicemail detection operation by a) generating a current audio analysis stream containing audio characteristics of audio received beginning when the call to the forwarding telephone number is answered, b) comparing the current audio analysis stream to each one of the audio analysis streams in the voicemail fingerprint of the known voicemail greeting associated with the forwarding telephone number, and c) in response to detecting that the current audio analysis stream matches one of the audio analysis streams contained in the voicemail fingerprint for the known voicemail greeting associated with the forwarding telephone number, detecting that the call to the forwarding telephone number has been answered by a voicemail box of the forwarding telephone number, and in response to detecting that the call to the forwarding telephone number has been answered by the voicemail box of the forwarding telephone number, transfer the received call to the secondary destination corresponding to the top level telephone number.

10. The electronic device of claim 9, wherein the audio characteristics in each of the audio analysis streams in the voicemail fingerprint comprise a series of audio characteristic chunks, and wherein each audio characteristic chunk in the audio analysis streams in the voicemail fingerprint contains at least one value representing at least one audio characteristic of a corresponding one of a plurality of equal length time periods within the known voicemail greeting; and wherein the audio characteristics in the current audio analysis stream comprise a series of audio characteristic chunks, and wherein each audio characteristic chunk in the current audio analysis stream contains at least one value representing at least one audio characteristic of a corresponding one of a plurality of equal length time periods within the audio received beginning when the call to the forwarding telephone number was answered.

11. The electronic device of claim 10, wherein each audio characteristic chunk in the audio analysis streams contains a value representing a maximum volume and a value representing a strongest frequency in the corresponding one of the plurality of equal length time periods in the known voicemail greeting; and wherein each audio characteristic chunk in the current audio analysis stream contains a value representing a maximum volume and a value representing a strongest frequency in the corresponding one of the plurality of equal length time periods in the audio received beginning when the call to the forwarding telephone number was answered.

12. The electronic device of claim 9, wherein the program code, when executed by the processing circuitry, further causes the processing circuitry to store a voicemail fingerprint of a known voicemail greeting by:

recording a voicemail greeting of at least one mobile network operator;

generating a voicemail fingerprint for the recorded voicemail greeting of the mobile network operator; and storing the voicemail fingerprint of the mobile network operator as a voicemail fingerprint of a known voicemail greeting corresponding to at least one forwarding telephone number.

13. The electronic device of claim 9, wherein the program code, when executed by the processing circuitry, further causes the processing circuitry to store a voicemail fingerprint of a known voicemail greeting by:

in response to detecting that a voicemail fingerprint is not stored for one of the forwarding telephone numbers, performing a candidate voicemail fingerprint generation operation for the forwarding telephone number by a) recording audio received beginning when a first call to the forwarding telephone number is answered, b) in response to detecting that a requested user input was not received prior to expiration of a time out period following the first call to the forwarding telephone number being answered, determining that the first call was answered by a voicemail box of the forwarding telephone number and generating the candidate voicemail fingerprint based on the recording of the audio received beginning when the first call to the forwarding telephone number is answered; and performing a voicemail fingerprint confirmation operation for the forwarding telephone number by a) recording audio received beginning when a second call to the forwarding number is answered, b) in response to detecting that a requested user input was not received prior to expiration of a time out period following the second call to the forwarding telephone number being answered, determining that the second call was answered by the voicemail box of the forwarding telephone number and generating a new voicemail fingerprint based on the recording of the audio received beginning when the second call to the forwarding telephone number is answered, c) comparing the new voicemail fingerprint to the candidate voicemail fingerprint, and d) in response to the new voicemail fingerprint matching the candidate voicemail fingerprint, storing the candidate as the voicemail fingerprint of the known voicemail greeting for the forwarding telephone number.

14. The electronic device of claim 9, wherein the program code, when executed by the processing circuitry, further causes the processing circuitry to store a voicemail fingerprint of a known voicemail greeting by:

in response to receipt of a system administrator command to reset the voicemail fingerprint corresponding to a forwarding telephone number specified by the system administrator command, a) initiating a call to the forwarding telephone number specified by the system administrator command, b) generating a voicemail fingerprint using the audio received when the call to the forwarding telephone number specified by the system administrator command is answered, and c) storing the voicemail fingerprint as the voicemail fingerprint of a known voicemail greeting corresponding to the forwarding telephone number specified in the system administrator command.

15. The electronic device of claim 11, wherein each one of the equal length time periods within the known voicemail greeting, and each one of the equal length time periods within the audio received beginning when the call to the forwarding telephone number was answered, have the same duration.

16. The electronic device of claim 15, wherein each one of the plurality of different temporal offsets within the known voicemail greeting is equal to a multiple of a constant time factor; and wherein the duration of the equal length time periods within the known voicemail greeting, and of the equal length time periods within the audio received beginning when the call to the forwarding telephone number was answered have a duration that is a multiple of the constant time factor.

17. A computer program product including a non-transitory computer readable medium which stores program code operable to detect voicemail greetings using voicemail fingerprints, the program code comprising:

program code for storing, for each one of a plurality of top level telephone numbers, i) a corresponding forwarding telephone number, and ii) a corresponding secondary forwarding destination;

program code for storing, for each one of the forwarding telephone numbers, a voicemail fingerprint of a known voicemail greeting, the voicemail fingerprint made up of a plurality of audio analysis streams, each one of the audio analysis streams containing audio characteristics of the known voicemail greeting associated with the forwarding telephone number beginning from a respective one of a plurality of different temporal offsets from the beginning of the known voicemail greeting;

program code for, in response to receipt of a call to one of the top level telephone numbers, i) initiating a call to the forwarding telephone number corresponding to the top level telephone number, and ii) performing a voicemail detection operation by a) generating a current audio analysis stream containing audio characteristics of audio received beginning when the call to the forwarding telephone number is answered, b) comparing the current audio analysis stream to each one of the audio analysis streams in the voicemail fingerprint of the known voicemail greeting associated with the forwarding telephone number, and c) in response to detecting that the current audio analysis stream matches one of the audio analysis streams contained in the voicemail fingerprint for the known voicemail greeting associated with the forwarding telephone number, detecting that the call to the forwarding telephone number has been answered by a voicemail box of the forwarding telephone number; and program code for, in response to detecting that the call to the forwarding telephone number has been answered by the voicemail box of the forwarding telephone number, transferring the received call to the secondary destination corresponding to the top level telephone number.

* * * * *